Sept. 26, 1933.   F. S. WIGLEY ET AL   1,928,471
LANDING GEAR FOR AIRCRAFT
Filed May 24, 1932   3 Sheets-Sheet 2
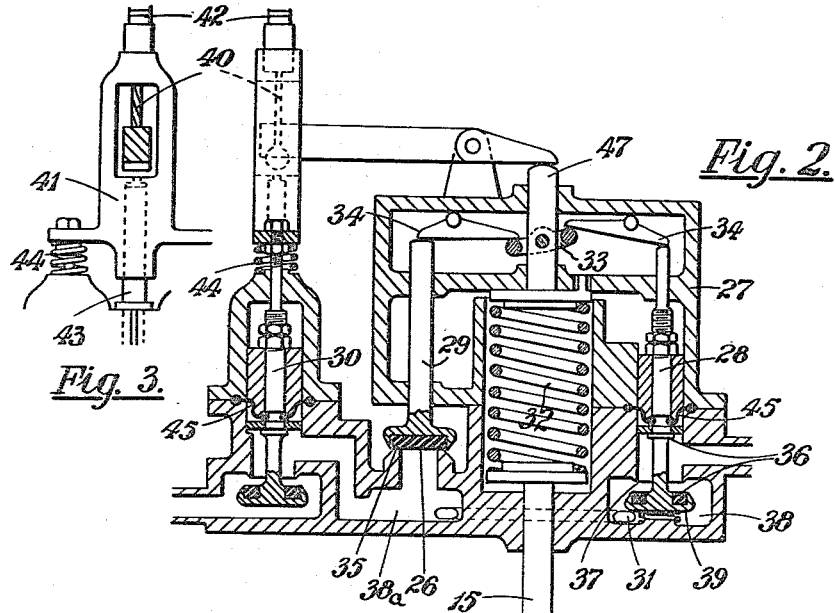
Fig. 2.
Fig. 3.
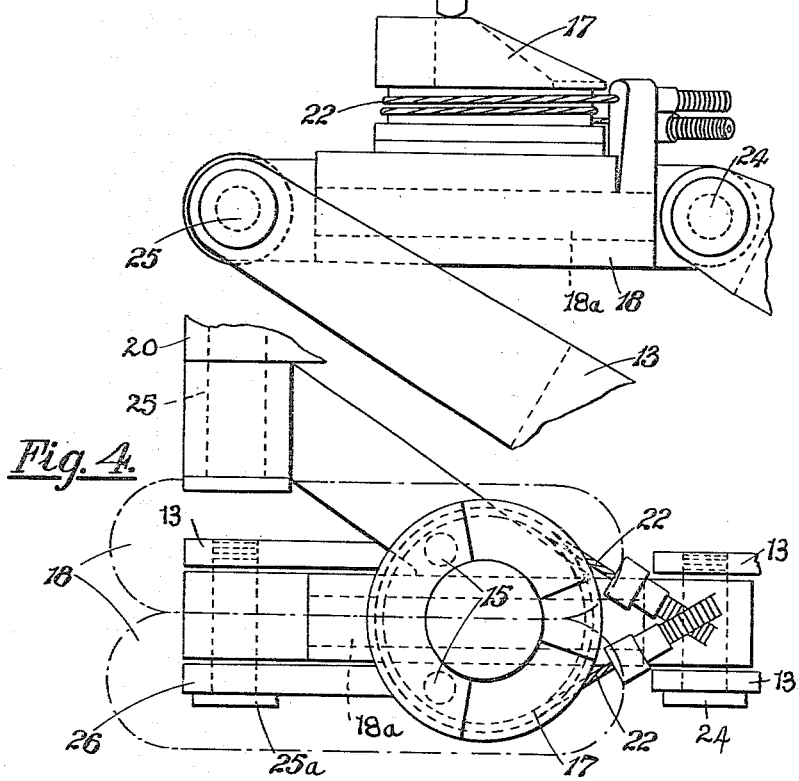
Fig. 4.
INVENTORS
Frank S. Wigley
Leonard F. Austing
by Usina & Rauber,
their attorneys

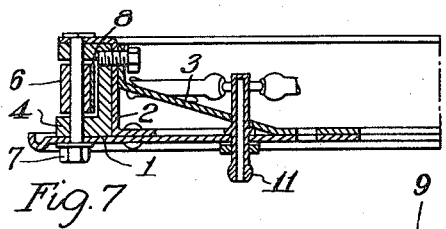
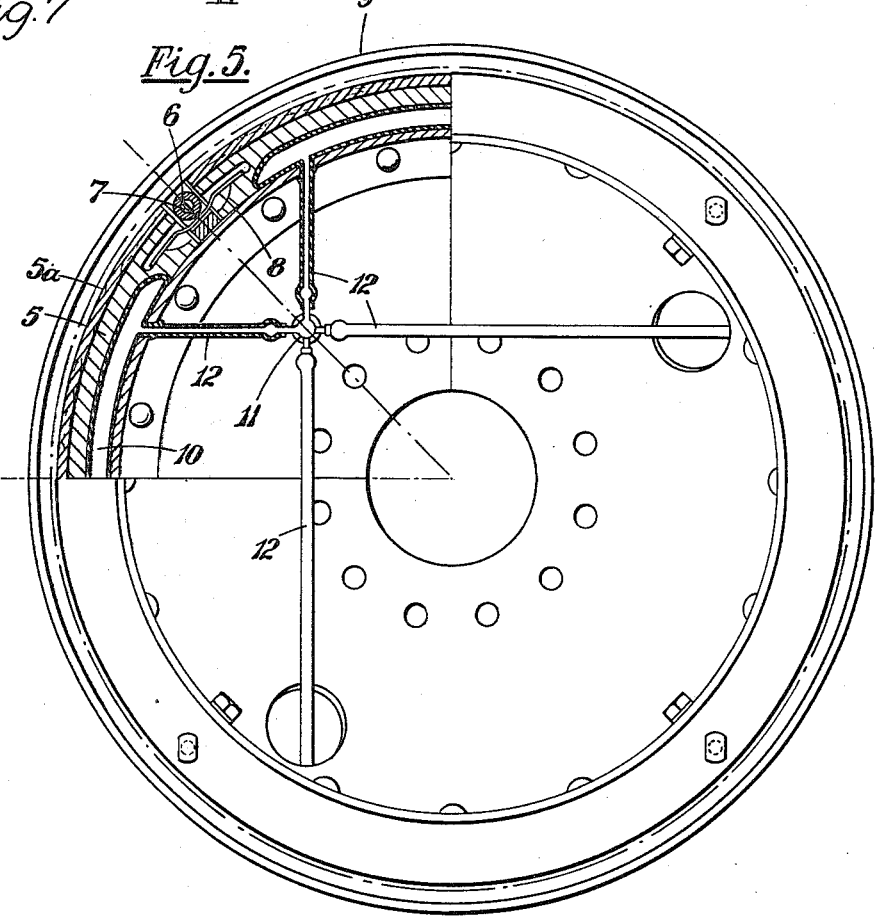
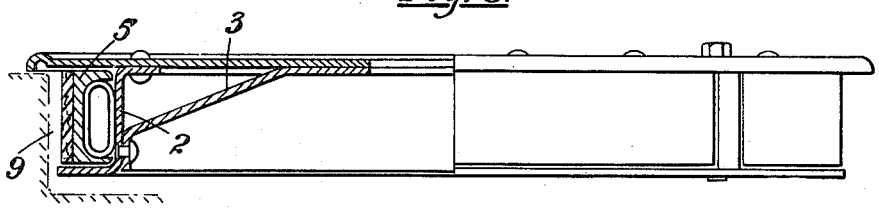

Patented Sept. 26, 1933

1,928,471

UNITED STATES PATENT OFFICE 1,928,471

LANDING GEAR FOR AIRCRAFT

Frank Spencer Wigley, Barnes, and Leonard Frederick Austing, Bromley, England

Application May 24, 1932, Serial No. 613,158, and in Great Britain June 9, 1931

20 Claims. (Cl. 244—2)

This invention concerns improvements in brake control for aircraft, and more particularly concerns improvements whereby the brakes may be applied and controlled automatically so that the pilot is not required, during landing and maneuvering, to perform any act which would not otherwise be performed by him if brakes were not fitted, inasmuch as it is highly desirable to relieve the pilot, when landing or maneuvering, of the necessity of operating any control other than the elevator, throttle and rudder which fully employ the hands and feet. It is also desirable that where brakes are applied and controlled automatically that they shall be controlled in such a manner that while the maximum braking effort that can be withstood by the aircraft is applied, and that while changes in braking effort throughout the range from zero to maximum effort are varied progressively, the pilot shall be relieved of any anxiety in connection with the possibility of the aircraft assuming that "attitude" or angular relation to the ground which is indicative of having reached or approached the unstable positions in which the aircraft will "nose over" with the probability of being partly or wholly wrecked or disabled in consequence.

The object of the invention is the provision of a system of aircraft brake control characterized by the inclusion of all the desirable features outlined above, it being thereby rendered possible to increase the maximum permissible braking effect to such an extent as no longer to render desirable a far forward position of the undercarriage with its inevitable disadvantage of increased tail weight and increased length of run required for taking off, this feature being of particular value because a forward position of the undercarriage neutralizes in part the benefits of braking when used in forced landings or in landing grounds of restricted area.

Where the landing area is restricted, it will be evident that the system of control about to be described will be of special value, for instance, in the landing of aircraft on ships decks which necessitates a high degree of braking with a short take off, and is quoted as an example of a case where the more difficult landing position justifies the pilot in being relieved of any extra work or anxiety due to the pressure of the brakes.

Further characteristics of the invention consist in the provision that when at rest, the brakes are fully applied and act as parking brakes without further intervention on the pilot's part in relation to any special control, and in the provision of an associated control whereby the brakes may be applied with unequal pressures at each side of the fore and aft center line of the fuselage, such control being preferably associated with the rudder bar or pedals.

In addition to the advantages of automatic control of the longitudinal equilibrium or "attitude" and of the brake effort obtained, the invention about to be described in more detail also acts as a valuable means of grounding the aircraft electrically, thereby preventing petrol fires due to the accumulated charges of static electricity, this essential function heretofore being usually performed by a metal shoe on the skid placed at the tail of the machine. Such skid shoe, however, adversely affects the "take off" of the aircraft and causes considerable surface damage to the aerodrome, in consequence of which pneumatic wheels are normally fitted to tail skids of aircraft provided with brakes with a corresponding loss of earthing means, which the ground contact of this invention now restores.

It has already been proposed to control the resilience or rebound of the machine at landing by unequal application of brake pressure to the landing wheels, such pressure varying inversely to the load sustained by each wheel when landing on an uneven keel that is transversely to the line of flight, and also in numerous cases to control the brake pressure applied to the landing wheels through a tail skid, this control becoming initially operative only after the stability of the tail is substantially assured by the grounding of the tail skid after a lapse of time throughout which the aircraft is still advancing towards the boundaries of the landing area.

It has also been proposed to pull the tail down by attaching to it a cable tensioned initially in part when the brakes are applied by the pilot and further tensioned by the displacement of a ground skid carried by the landing wheels.

But the present invention is concerned with an automatically continuous fluid pressure control operable independently of the pilot at his discretion and progressively self regulated by the attitude assumed by the aircraft at any moment in its line of flight after the landing wheels have first engaged the ground, before and until the tail is fully supported thereby.

According to this invention, we provide aircraft brake systems in which the attitude of the aircraft and the braking effort are regulated, until the tail is supported upon the ground, by the relative displacement of a ground contact which controls means for exerting fluid pressure on the brakes of the landing wheels. Preferably, the lower extremity of the ground contact is initially positioned at or immediately in rear of the lowest part of the wheel or tire which first engages the ground, and the upper end of the ground contact carries a valve control surface maintained in parallel relation to the ground.

In the preferred embodiment of the invention the ground contact comprises a parallel link motion consisting of a plurality of links pivoted to one another. This linkage carries rotatable operative connections, actuated by remote control, which may also deflect the rudder, through which unequal braking pressures may be applied to the wheels, which are unaffected by variations in the vertical displacement of the aircraft in relation to the ground due to the extension or contraction of the under-carriage parts above the axle, or due to tire deflation.

The braking action is controlled automatically by the attitude of the aircraft with respect to the ground. As the tail of the aircraft drops, the brakes are applied to the wheels with increasing pressure and, as the tail rises, they are gradually released. The brakes are preferably of the pneumatic type.

In order that the invention may be more readily understood and carried into effect, the invention will now be described with reference to the accompanying drawings, in which—

Fig. 2 is a sectional side elevation of a valve system and operating means forming a part of said mechanism.

Fig. 3 is a part sectional elevation of the Bowden cable control.

Fig. 4 is a part plan view of the valves shown in Fig. 3.

Fig. 5 is a part sectional side elevation of a wheel incorporating a brake drum.

Figs. 6 and 7 are part sectional end views of the brake drum.

Fig. 8 is a section of the brake controlling element.

Figure 1:
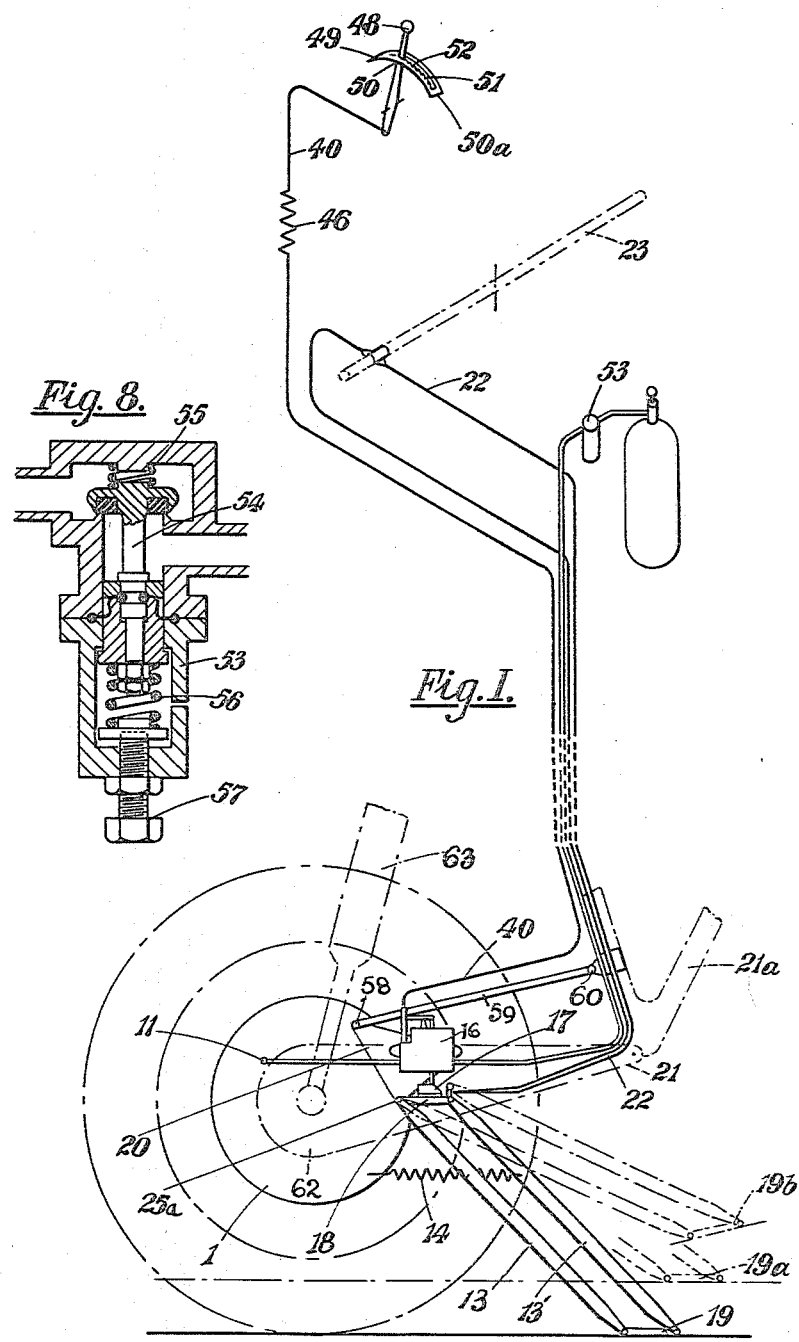
Fig. 1 is a diagrammatic view of mechanism embodying the invention.

Referring to the drawings, the invention is illustrated, by way of example, as applied to a brake mechanism in which each brake consists of a back plate 1, Figs. 1 and 7, in the form of a disc, supporting an annular rim 2, Figs. 6 and 7, forming a channel at the periphery of the back plate reinforced by a dished plate 3.

Equally spaced within the channel are U-shaped stops 4 against which the ends of the brake shoes 5 and linings 5a abut. Across each stop is a roller 6 held by the bolt 7 under which is a leaf spring 8 tending to pull the brake shoes away from the brake drum 9.

The brake is operated by compressed air or fluid under pressure, which is admitted through the union 11 and through connections 12 to the expansible rubber containers 10 located under each brake shoe to force the brake linings into contact with the drum. It will be understood, however, that other fluid operated brake mechanisms may be used.

The mechanism actuating the automatic control comprises a collapsible frame of parallelogram form having front and rear links 13 and 13', respectively, provided at their upper ends to a supporting structure on the under carriage of the aircraft and depending in a downwardly and rearwardly inclined position. The links 13 and 13' are drawn forwardly about their pivotal supports by springs 14 tensioned between them and the brake disc 1. When swung upwardly and rearwardly against the tension of the springs 14, by reason of a lowering of their support relative to the brake disc 1 resulting from the lowering of the tail of the aircraft, they serve to lift the stems 15 of a pair of brake control valves 16 through the lifting of a cam plate 17. The cam plate 17 is carried on an upper link 18 of the parallel linkage, the linkage being completed by a lower ground link 19. Through this linkage the upper and lower members 18 and 19 are always maintained parallel to the ground.

The linkages 13, 13', 18 and 19, are supported from the radius arm 62 extending rearwardly from the brake disc 1 and pivoted at its rear end 21 to an under carriage V-shaped strut 21a. This pivotal connection is such as to permit the upper link to be swung upwardly about a pivotal point to permit the links 13 and 13' to swing rearwardly, and also to deflect sidewise in the event that the aircraft should shift or swerve sidewise instead of directly forward. For this purpose the upper link 18 is supported from a pivot pin 25 on the radius arm 62 and passes through a branch of the link 18, (Figs. 2 and 4), and the link 18, in turn, has an inner round bar or shaft member 18a coincident with the axis of the link 18 and supported through its mid-portion in the link 18, and having projecting ends on which the links 13 and 13', respectively, are pivoted by means of pivot pins 25a and 24, respectively. Through this arrangement, therefore, the link 18 may swing vertically about the axis of the pin 25, and the links 13 and 13' may swing sidewise on the axes of the shaft 18a and the link 18. The position of the pivot 25, from which the frame as a whole is suspended, may coincide in side elevation with the pivot 25a or, may be above it.

The cam plate 17 is mounted on the link 18 as shown in Figs. 1, 2 and 4.

When the link 18 remains in horizontal position, the cam plate 17 and the valve stem 15 remain in their lower positions, as shown in Fig. 2. When the link 18 is, however, swung upwardly about the pivot 25, the valve stem 15 is lifted by the cam plate 17. The link 18 is tilted about the pivot 25 only by a dropping of the rear or tail portion of the air craft and a consequent lowering of the rear end of the radius arm 62 relative to the ground and the brake disc 1. If a tire is wholly or partially deflated, or if the member 19 passes over an obstacle such as a large stone or a mound, it simply rises from the position shown in full lines in Fig. 1 to the position shown in dotted lines at 19a, without lifting the upper link 18 or lifting the valve stem 15. When, however, the tail of the aircraft drops and the relation of the ground to the under carriage of the aircraft changes to that indicated in dotted lines at 19b, the position of the lower link is tilted upwardly and with it the link 18, as these two links are always parallel. The cam plate 17 is thereby also tilted upwardly, lifting the valve stem 15 and operating the valves to apply the brakes. It will be apparent, therefore, that the valve stem 15 is lifted and the brakes operated only when the tail part of the craft drops to a certain distance relative to the wheels.

The valve construction hereinafter described is such that the application of the brakes increases as the tail drops, fully applying the brakes when the tail is fully down.

To prevent the operation of the valve 16 and of the linkages 13, 13', 18 and 19 being affected by the depression of the "oleo" leg 63 connecting the axle of the wheel 1 to the aircraft fuselage, the valve 16 is not attached to the radius arm 62, but to a triangular shaped plate 20 which is so mounted on the under carriage of the aircraft that it is not depressed relative to the cam plate 17 by a compression of the leg 63. For this purpose the plate 20 is pivoted at its lower end on the pivot pin 25 and is pivotally connected at its upper end 58 to a link 59 which is pivoted at its rear end 60 to the V-shaped strut 21a.

The lower end of the plate 20 is also connected through the radius arm 62 to the V-shaped strut 21a.

The points 58, 60, 21 and 25 thus define the sides of a parallelogram which, when the attitude of the fuselage alters on compression of the oleo leg on landing, correct the angle of the valve units, and lift them away from the face cam, and so relieve the load on the valve actuating stems in due proportion to the change in fuselage attitude from this cause.

As already described, the lower link 19 of the parallelogram linkage forming the ground contact may be distorted by upward displacement to permit of vertical movements without affecting the positions or angle of the top member in relation to the ground.

The face cam 17, Fig. 2, can be rotated by means of a continuous Bowden cable 22 from the rudder bar 23 of the aircraft. As the cam is rotated, the inclined face is brought beneath one of the valve stems, and, in effect, removes some or the whole load from that stem, in consequence of which a differential braking is obtained causing the aircraft to turn as if steered.

Each control valve unit 16a consists of a body 27 containing three rubber-faced valves, inlet 28, exhaust 29 and parking 30, the inlet and exhaust valves being operated through a lower stem 15, a spring 32 and rocker arms 33, 34. The small rocker arm 33 prevents the rubber face 26 on the exhaust valve from being unduly compressed by seating 35.

The inlet valve 28 may either be a wholly balanced valve (as shown), consisting of two interconnected interior faces 36 having similar effective areas, so that any pressure between them does not tend to move the valve off its seating, or may be a partially balanced valve (as shown for the parking valve). With the balanced valve, a light spring is used to keep the valve from bouncing off its seating, but the unbalanced valve is normally kept on its seating by the difference in load on the two interior faces.

As a load is applied to the lower stem 15 by the face cam 17, the inlet valve is moved from its seating 37, thereby admitting compressed air into the chamber 38 through the channel 31 to chamber 38a and so to the brakes as in position shown in Fig. 2.

But the pressure builds up until the load on the exterior face 39 of the valve, due to the air pressure, is greater than that applied by the lower stem 15, and the valve shuts unless a greater load be applied to the valve by the stem and, when the load on the stem 15 falls, the accumulated pressure of air in the chamber 38 opens the exhaust valve 29, thus lowering the pressure in the brakes.

The air passes from the chamber 38 to the brakes through parking valves 30 which may be of the balanced or unbalanced type. The two parking valves 30, which are controlled by one Bowden cable 40 from the pilot cock-pit, are attached to a stop 41 of the casing 42 of the Bowden cable which is guided on a pin 43 clamped between the two valves 30. When there is not load on the cable, the parking valves are closed by springs 44, thus locking compressed air in and continuing to apply the brakes irrespective of the attitude of the aircraft.

The inlet and parking valves are sealed at one end by a dished rubber diaphragm 45.

The cable 40 which operates the parking valve is also used to apply a load via a spring 46, Fig. 1, to an upper stem 47, Fig. 3. This, in effect, partially or wholly removes from the inlet and exhaust valves, the load applied by the lower stem 15, by slightly compressing the spring 32. This device allows the brakes to be released by hand for "taking off", or in an emergency, or to give a lower braking pressure.

The Bowden cable 40 is connected to a hand lever 48, Fig. 1, in the pilot's cockpit, certain positions of the hand lever giving the following results.

When the lever is at one end 49 of the quadrant 50, giving a maximum load on the cable, the brakes cannot be applied. But when the lever is at the other end 50a, giving no load at all in the cable, the brakes are applied for parking irrespective of the attitude of the aircraft and thus, for example, the tail may be lifted without releasing the brakes. When the lever is in position 51, putting a small load on the cable, the air for parking is released and the brakes may be automatically applied by the attitude of the aircraft. Between this position and that of 49, various degrees of braking are obtained.

The intermediate positions between on and off reduce the pressure in the brakes and also have the effect of causing the brakes to be automatically released when the tail is nearer the ground than when the lever is set to the full on position, thus providing a very convenient method of restricting the tail lift with safety and one that is always under the pilot's immediate control.

It may appear at first sight that an adjustment with regard to the desired position of the tail lift would result in a brake pressure below the desired maximum, but this is not so, as compensation can be provided by a higher air pressure to the valve control unit from a reducing valve between the source of fluid pressure and the valve control unit.

A reducing valve 53 may be used, if necessary, to prevent high loads falling on the valves where a high pressure supply is used. (The valve may consist of a wholly or partially balanced valve 54, a spring 55 if valve is wholly balanced, and a spring 56 with adjusting screws 57 which enables a desirable maximum pressure of air to reach the control valves.)

What we claim is:

1. Aircraft braking apparatus comprising a brake applying mechanism, a lower ground contact member mounted to maintain a parallel relation to the ground, an upper member movable relative to the aircraft structure to actuate said brake applying mechanism, and means connecting said ground contact member and said upper member to hold the latter at a fixed angle relative to the former as said aircraft structure tilts to different positions relative to the ground and to said upper and lower members to thereby actuate said brake mechanism.

2. Aircraft braking apparatus comprising a brake applying mechanism for progressively applying brake pressures, a lower ground contact member mounted to maintain a parallel relation with the ground, an upper member movable relative to the aircraft structure to actuate said brake applying mechanism, and means connecting said ground contact member and said upper member to hold said members in relatively fixed angular positions at variable relative altitudes to cause relative movement between said aircraft structure and said upper members to apply the brakes progressively as the tail of said aircraft is progressively lowered.

3. Aircraft braking apparatus comprising pneumatic brake applying mechanism, a valve for controlling said mechanism, a lower ground contact member mounted to maintain a parallel relation with the ground, an upper member movable relative to the aircraft structure to actuate said brake valve, and means connecting said ground contact member and said upper member to hold the latter in fixed angular position relative to the ground and to vary its position to said aircraft to apply the brake progressively as the tail portion of said aircraft drops.

4. Aircraft braking apparatus comprising a pair of brake applying mechanisms, one for each of two parallel wheels, a lower ground contact member, an upper member movable relative to the aircraft structure to actuate said brake applying mechanisms, means to rotate said upper member to diminish the brake application of either of said mechanisms relative to the other, and means connecting said ground contact member and said upper member to swing the latter to brake applying position when the tail portion of the aircraft is lowered.

5. Aircraft braking apparatus comprising a pair of pneumatic brake applying mechanisms, each having a control valve, a lower ground contact member, an upper member movable relative to the aircraft structure, said upper member having a cam face movable therewith and rotatable relative to the stems of said pneumatic control valves partially or completely to clear one of said valves, and means connecting said ground contact member and said upper member to swing the latter to brake applying position when the tail portion of the aircraft is lowered.

6. The apparatus of claim 5 and a remote control for rotating said cam face.

7. The apparatus of claim 5 and a remote control for rotating said cam face and also controlling the rudder of the aircraft.

8. Aircraft braking apparatus comprising pneumatic brake applying mechanism, actuating means maintaining a parallel relation with the ground and variable to the aircraft structure, and means actuated by said actuating means to actuate said brake applying mechanism as the tail of said aircraft lowers relative to said actuating means.

9. Aircraft braking apparatus comprising a pair of pneumatic brake applying mechanisms, each having a control valve, a cam face movable vertically relative to said control valve, means for moving said cam face horizontally partially or completely to clear either of said valves, actuating means having a fixed position relative to the ground and a variable position relative to the aircraft structure to move said cam face to valve opening position progressively as the tail portion of the aircraft lowers relative to said actuating means.

10. Aircraft braking apparatus comprising a pair of pneumatic brake applying mechanisms, each comprising an actuating valve, a cam face tiltable to actuate said valves and rotatable on an axis perpendicular to its tilting axis partially or completely to clear either of said valves, actuating means having fixed position relative to the ground and swinging relative to the aircraft structure and positioned to move said control valves to brake applying positions as the rear portion of said aircraft lowers relative to said actuating mechanism.

11. Aircraft braking apparatus comprising a brake applying mechanism, a lower ground contact member, an upper member movable relative to the aircraft structure to actuate said brake applying mechanism, parallel linkage holding said ground contact member and said upper member in fixed parallel relation, said members being tiltable relative to the aircraft structure to actuate said brake applying mechanism as the rear of said airplane structure swings downwardly.

12. The apparatus of claim 11 in which said linkage has a fore and aft pivotal connection to permit side swing of said parallel linkage.

13. The apparatus of claim 1 and means for electrically grounding said mechanism through said ground member.

14. The apparatus of claim 1 and means for pivoting said connecting means of said ground contact member, and comprising a member supported by the under carriage and vertically displaceable relative thereto.

15. The apparatus of claim 1 and means for pivoting said connecting means of said ground contact member, and comprising a plate supported by the under carriage and a link pivoted to the plate and to the under carriage.

16. Aircraft braking apparatus comprising a pneumatic brake applying mechanism, a lower ground contact member movable in translatory and tilting movements relative to the aircraft structure, an upper member to actuate said brake applying mechanism, means connecting said ground contact member and said upper member to swing the latter to different brake applying positions when the lower ground contact member swings to different angles relative to said aircraft structure, and means for varying the actuating load of said pneumatic means.

17. The apparatus of claim 16 and a valve to seal the fluid pressure in the pneumatic mechanism to hold the application of said brakes.

18. The apparatus of claim 4 in which each pneumatic means is provided with inlet and exhaust valves, and a spring-loaded spindle having rocker arms pivoted thereto, the outer ends of the rocker arms respectively controlling the inlet and exhaust valves.

19. Aircraft braking apparatus comprising a brake applying mechanism, a ground contact structure pivoted adjacent the wheels of said aircraft and having a lower member following the position of the ground and movable to independent vertical and tilting positions relative to the aircraft, and an upper member unaffected by the vertical movements of said lower member but movable with the tilting movements of the latter, and a brake applying mechanism movable to different degrees of brake application by the movements of said upper member.

20. The apparatus of claim 8 in which said actuating means are pivoted to said aircraft adjacent the wheels of the latter.

FRANK SPENCER WIGLEY.
LEONARD FREDERICK AUSTING.